United States Patent [19]
Tashiro et al.

[11] Patent Number: 5,217,613
[45] Date of Patent: Jun. 8, 1993

[54] FILTER APPARATUS

[75] Inventors: Minoru Tashiro; Makoto Tashiro, both of Tokyo, Japan

[73] Assignee: Bunri Industry Co., Ltd., Tokyo, Japan

[21] Appl. No.: 809,245

[22] Filed: Dec. 18, 1991

Related U.S. Application Data

[63] Continuation of Ser. No. 455,878, Dec. 29, 1989, abandoned, which is a continuation of Ser. No. 917,578, Oct. 10, 1986, abandoned.

[30] Foreign Application Priority Data

Oct. 18, 1985 [JP] Japan ............... 60-160490[U]

[51] Int. Cl.$^5$ ............................................. B01D 33/46
[52] U.S. Cl. .................................. 210/396; 210/397; 210/402
[58] Field of Search ............... 210/396, 397, 402, 406, 210/413, 414, 415

[56] References Cited

U.S. PATENT DOCUMENTS

| | | | |
|---|---|---|---|
| 9,608 | 3/1853 | Bessemer | 210/402 |
| 560,511 | 5/1896 | Linke | 210/397 |
| 939,448 | 11/1909 | Sheak | 210/396 |
| 977,209 | 11/1910 | Melvin | 210/396 |
| 1,453,311 | 5/1923 | Engel, Sr. | 210/394 |
| 2,083,812 | 6/1937 | Barrett | 210/394 |
| 2,242,861 | 5/1941 | Keene | 210/396 |
| 2,454,134 | 9/1948 | Burleson | 210/402 |
| 2,525,135 | 10/1950 | Huff | 210/402 |
| 2,758,722 | 8/1956 | Murray | 210/394 |
| 2,877,901 | 3/1959 | Maus | 210/298 |
| 3,472,383 | 10/1969 | Daniels et al. | 210/408 X |
| 3,784,017 | 1/1974 | Arnold et al. | 210/396 |
| 3,840,120 | 10/1974 | Greenberg | 210/298 |
| 4,306,975 | 12/1981 | Siewert | 210/394 |
| 4,437,991 | 3/1984 | Tashiro | 210/413 |
| 4,529,509 | 7/1985 | Nilsson | 210/404 X |

OTHER PUBLICATIONS

Purchas, Derek B., *Industrial Filtration of Liquids*, 2nd Ed. CRC Press, Cleveland, Ohio, 1971, pp. 82 and 83.
Dickey, George D., *Filtration*, Reinhold Pub. Corp., N.Y., 1961, pp. 49 and 56-59.

*Primary Examiner*—Stanley S. Silverman
*Assistant Examiner*—Cynthia L. Nessler
*Attorney, Agent, or Firm*—Armstrong, Westerman, Hattori, McLeland & Naughton

[57] ABSTRACT

A filter apparatus includes a mesh filter consisting of a flexible sheet having a smooth surface and a multiplicity of through-holes and formed into a cylindrical configuration. The leading edge of a scraper is brought into abutting contact with the outer surface of the cylindrically formed mesh filter, or two scrapers can be provided on the inner and outer surfaces of the mesh filter with their leading edges abutted against these surfaces. Provided within the mesh filter is a support shaft serving also as a discharge pipe. The discharge pipe discharges clean oil filtered by the mesh filter, and the support shaft rotatably supports the mesh filter. The cylindrical mesh filter is disposed in a tank for accommodating cutting oil or abrasive oil containing solid foreign matter such as cutting chips or abrasive grains. The mesh filter is rotated on the discharge pipe/support shaft by a drive mechanism. The oil containing the solid foreign matter is passed through the cylindrical mesh filter from the outer to the inner side thereof so that the foreign matter in the oil is trapped by the through-holes. The foreign matter thus trapped is scraped off the mesh filter by the scraper or scrapers as the mesh filter rotates.

12 Claims, 2 Drawing Sheets

FILTER APPARATUS

This application is a continuation of application Ser. No. 455,878, filed on Dec. 29, 2989, now abandoned, which in turn is a continuation of application Ser. No. 917,578, filed Oct. 10, 1986, now abandoned.

BACKGROUND OF THE INVENTION

This invention relates to a filter apparatus for filtering a liquid such as cutting oil or abrasive oil by removing solid foreign matter such as cutting chips and abrasive grains from the liquid.

Factories exist in which a variety of machine tools are installed for machining metal materials. These machine tools make use of cutting and abrasive oils employed in a circulating manner. The system through which the oil is circulated is provided with a filtration apparatus for filtering the oil by separating the cutting chips or abrasive grains from the cutting or abrasive oil containing this foreign matter. One such filtration apparatus known in the art is a mesh filter apparatus.

A mesh filter apparatus is provided with a filter which allows only a liquid to pass therethrough following capture of the foreign matter contained in the liquid, and a scraper adapted to prevent clogging of the filter by scraping off the foreign matter that the filter has captured.

When a cloth filter or wire mesh is used as the filter employed in the aforementioned mesh filter apparatus, the cloth or wire mesh captures the cutting chips or abrasive grains efficiently but these contaminants tend to become caught in the woven or knitted portions of the cloth or wire mesh. Once this occurs, it is very difficult to remove the cutting chips or abrasive grains from the filter. Even though the surface of the filter is scraped by the scraper, the clinging foreign matter cannot be scraped off with ease and the filter cannot be reclaimed in an effective manner.

If a brush is used as the scraper in the above-described mesh filter apparatus, the foreign matter becomes trapped in the brush and grows into a large deposit that detracts from the scraping action of the brush in a short period of time.

In an effort to eliminate the aforementioned drawbacks, the applicant has already developed a mesh filter apparatus in which the filter member is a smooth-surfaced thin sheet having a multiplicity of through-holes, an example of the filter member being a punched metal sheet. Scrapers each comprising a resilient blade are brought into sliding contact with the front and back surfaces of the filter made of the thin sheet. Applications claiming this mesh filter apparatus have been filed in Japan, the U.S.A. and other countries (see the specifications of Japanese Patent Publication No. 60-014603 and U.S. Pat. No. 4,437,991).

Since the front and back surfaces of the sheet are smooth in the disclosed mesh filter apparatus, little of the trapped foreign matter clings to the sheet. Moreover, the scrapers are blade-shaped and therefore these also attract little of the foreign matter. Thus the apparatus is advantageous in that the foreign matter can be scraped off in smooth fashion.

However, a problem is encountered in that the structure of the above-described mesh filter apparatus is such that the mesh filter is disposed across a wide area near the outlet of a tank accommodating the cutting or abrasive oil, and the scrapers are in sliding contact with the front and back surfaces of the mesh filter. In other words, the mesh filter is fixed and the scrapers travel on both sides of the filter. As a result, not only is a large amount of space needed to install the mesh filter apparatus, but the scraper drive mechanism for moving the scrapers is of some complexity.

SUMMARY OF THE INVENTION

The present invention has been devised in view of the foregoing circumstances and its object is to provide a structurally simple filter apparatus the filtering performance whereof will not decline even if used over an extended period of time.

According to the present invention, a mesh filter comprising a smooth-surfaced flexible sheet provided with a multiplicity of through-holes is formed into a cylindrical configuration and the leading edge of a scraper is brought into abutting contact with the outer surface of the cylindrically formed mesh filter. Alternatively, two scrapers can be provided on the inner and outer surfaces of the mesh filter with their leading edges abutted against these surfaces. The cylindrically formed mesh filter is disposed in a tank accommodating cutting or abrasive oil in which foreign matter such as cutting chips or abrasive grains has become mixed. A drive mechanism rotates the mesh filter about the axis of the cylinder defining its shape. The oil containing the aforementioned solid foreign matter is passed through the cylindrical mesh filter from the outer toward the inner side thereof so that the foreign matter in the oil is trapped by the through-holes. The foreign matter thus trapped is scraped off the mesh filter by the scraper or scrapers as the mesh filter rotates.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Let us first describe the overall structure of a cutting chip separating apparatus employing the filter apparatus of the present invention.

Figure 4:
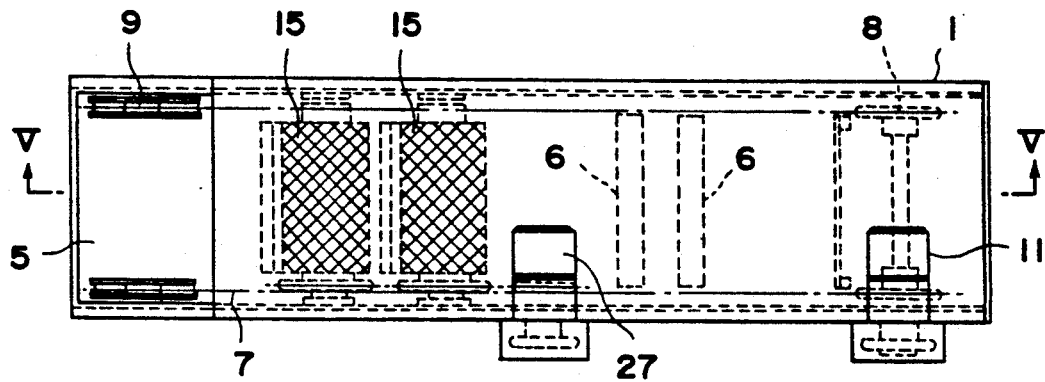
FIG. 4 is a plan view showing the entirety of an apparatus for separating cutting chips from oil by deposition.
Figure 5:
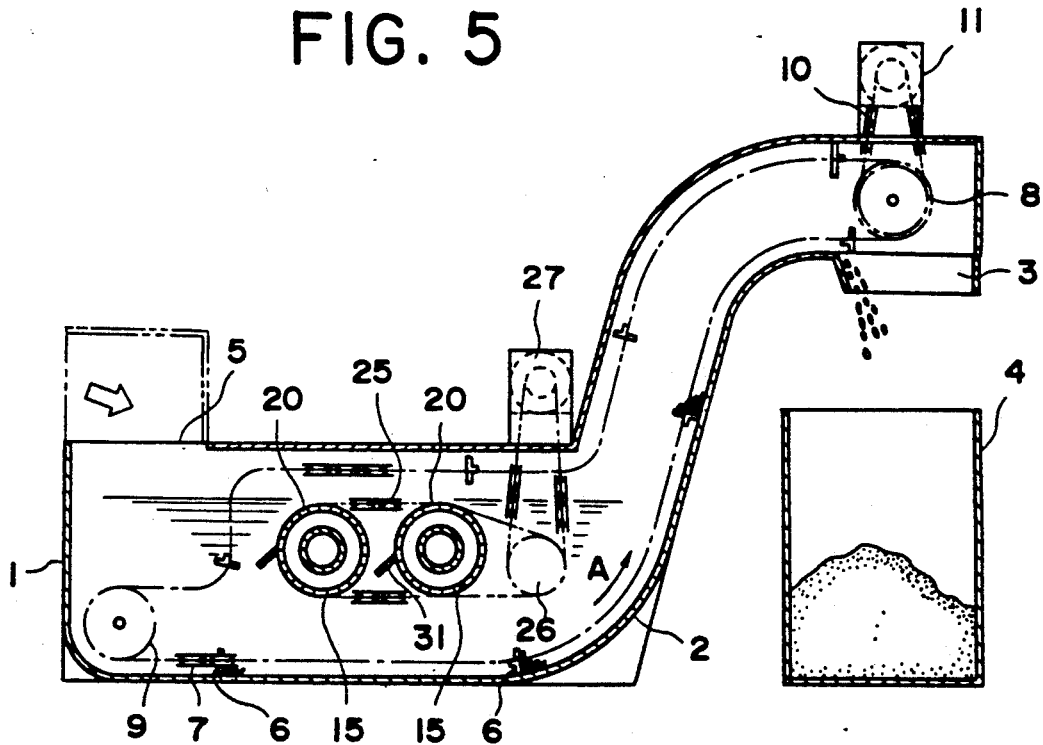
FIG. 5 is a sectional view taken along line V—V of FIG. 5.

As shown in FIGS. 4 and 5, a separating tank 1 receives oil discharged from machine tools and containing foreign matter such as cutting chips. The tank 1 has a bottom wall 2 one end of which is curved and extended upwardly on the right side of the figures. The extended end of the bottom wall 2 is formed to include a discharge chute 3 from which the foreign matter is discharged into a chip receptacle 4 provided below the chute 3.

The upper surface of the separating tank 1 on the left side thereof in the figures is formed to include a charging port 5 into which the oil containing the foreign matter is charged. The arrangement is such that oil containing metal chips such as iron or aluminum or non-metal chips such as glass and plastic, which are produced as the result of machining performed by machine tools, are introduced to the charging port 5 by a pipe or the like, which is not shown.

The apparatus includes a plurality of scrapers 6 which travel while in sliding contact with the bottom wall 2 of separating tank 1. The scrapers 6 are driven by a scraper chain 7 so as to travel along the bottom wall 2 in the direction of arrow A (one way). The scraper chain 7 is stretched between a drive chain sprocket 8 and a driven chain sprocket 9. The drive chain sprocket 8 is rotatively driven by a motor 11 via a drive chain 10.

Cutting chips become mixed in with the oil used in a machining process performed by machine tools in a factory. When the oil containing these chips is introduced into the separating tank 1 through the charging port 5, the comparatively heavy chips settle on the bottom wall 2 of the separating tank 1 under the influence of gravity.

When driven in the direction of arrow A by the motor 11, the scrapers 6 travel along the bottom wall 2 while in sliding contact therewith and thus carry the cutting chips deposited on the bottom wall 2 to the discharge chute 3 while sweeping the chips along the bottom wall. The chips that reach the discharge chute 3 fall into the chip receptacle 4.

Thus, the comparatively heavy cutting chips deposited on the bottom wall 2 by the force of gravity are removed by the scrapers 6.

The separating tank 1 also accommodates a mesh filter apparatus 15 according to the present invention.

Figure 1:
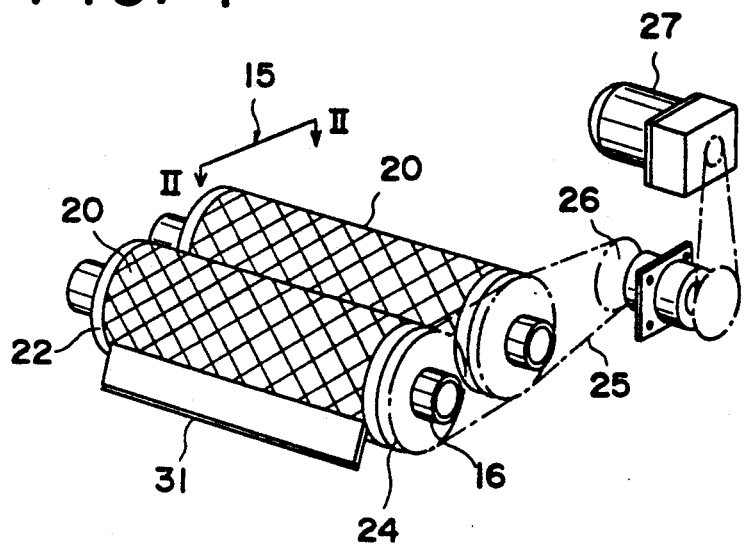
FIG. 1 is a perspective view illustrating the overall structure of a filter apparatus according to the present invention.
Figure 2:
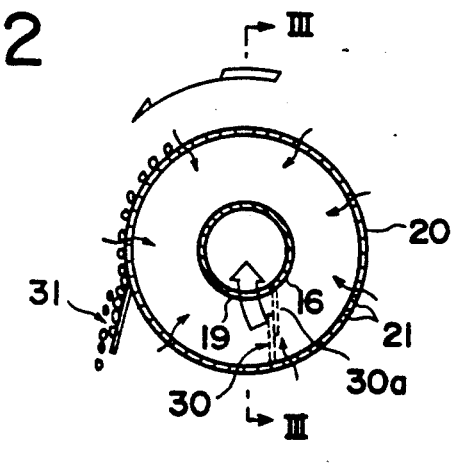
FIG. 2 is a sectional view taken along line II—II of FIG. 1.
Figure 3:
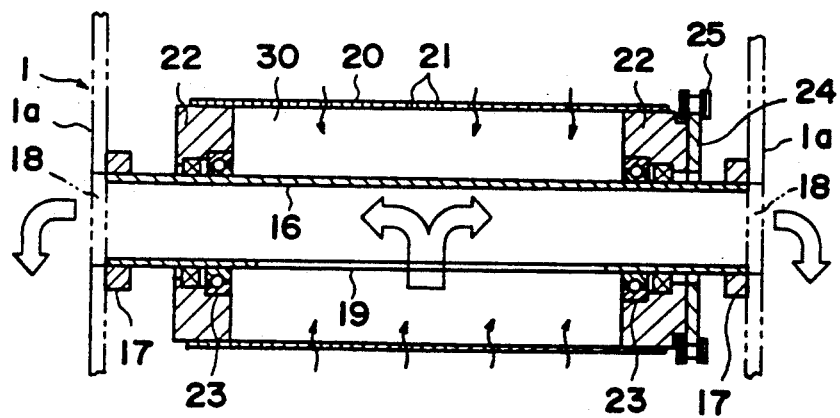
FIG. 3 is a sectional view taken along line III—III of FIG. 1.

The structure of the mesh filter apparatus 15 according to the invention is illustrated in FIGS. 1, 2 and 3. FIG. 1 is a perspective view of the overall apparatus, FIG. 2 a sectional view taken along line II—II of FIG. 1, and FIG. 3 a sectional view taken along line III—III of FIG. 2.

As shown in FIGS. 1, 2 and 3, the filter apparatus 15 includes a support shaft 16 that also serves as a discharge pipe. The separating tank 1 has parallel side walls 1a, 1a to which the ends of the shaft 16 is secured by supports 17, 17. The shaft 16 has a lower wall formed to include an inlet 19. The discharge pipe/support shaft 16 has two open ends communicating with outflow ports 18, 18 formed in the two side walls 1a, 1a of the separating tank 1, respectively. Clean cutting oil filtered by the mesh filter apparatus 15 in a manner described below flows out from the outflow ports 18, 18. Though the arrangement is not shown, the outflow ports 18, 18 are connected to a tank which collects the clean cutting oil. Further, it should be noted that the outflow port 18 may be provided in only one side wall 1a of the separating tank 1 and communicated with an opening in only one end of the shaft 16.

Numeral 20 denotes a mesh filter of a structure in which a thin smooth-surfaced flexible sheet provided with a multiplicity of through-holes 21 punched therethrough is bent and formed into a cylindrical configuration. The thin flexible sheet comprises a sheet of punched metal or a sheet of a synthetic resin having a smooth surface.

The two ends of the mesh filter 20 formed into the cylinder have respective end caps 22, 22 secured thereto for closing these ends. The end caps 22, 22 also serve to retain the cylindrical shape of the mesh filter 20.

The end caps 22, 22 are freely rotatably supported on the discharge pipe/support shaft 16 by respective bearings 23, 23. Thus, the cylindrically formed mesh filter 20 is freely rotatably mounted on the shaft 16.

A driven chain sprocket 24 is fixedly secured to one end cap 22 of the two end caps 22, 22, and a chain 25 is wound around the driven chain sprocket 24. The chain 25 is also wound around a drive chain sprocket 26, which is rotatively driven by a motor 27 arranged on the upper surface of the separating tank 1. The cylindrically formed mesh filter 20 is thus rotated by the motor 27.

It should be noted that an arrangement can be adopted in which, rather than using the motor 27, the driven chain sprocket 24 is rotated by being operatively associated with the scraper chain 7 or by a driving force obtained from the motor 11.

The filter apparatus 15 includes a scraper 31 arranged on the outer side of the cylindrical mesh filter 20 in such a manner that its leading edge is in abutting contact with the surface of the mesh filter 20. Besides the scraper 31 on the outer side, it is also permissible to provide a scraper 30 on the inner side of the cylindrical mesh filter 20 and arrange this scraper so that its leading edge abuts against the inner surface of the filter 20.

The scraper 31 is secured to a bracket (not shown) spanning the two side walls 1a, 1a of the separating tank 1, and the scraper 30 is secured to the discharge pipe/support shaft 16 by a bracket 30a.

In the illustrated embodiment, the cylindrically formed mesh filter 20 is provided at each of two locations, the two filters are used in side-by-side relation and are arranged in the cutting oil accommodated by the separating tank 1. However, the mesh filters 20 are not limited to two in number. It should be obvious that one mesh filter 20 can be provided and that the number of filters can be increased to three or more as the occasion demands.

The operation of the mesh filter apparatus 15 having the above construction will now be described.

In the separating tank 1, those cutting chips contained in the oil introduced from the charging port 5 that are comparatively heavy in weight deposit on the bottom wall 2 by settling. Meanwhile, the cutting chips and other particulate matter of comparatively light weight remain mixed in the oil in a floating state. The oil in which the comparatively light cutting chips and particles are mixed flows into the mesh filter 20 upon passing through the through-holes 21 possessed by the mesh filter 20. In passing through the holes 21, the cutting chips and particulate foreign matter are trapped by the filtering action of the holes 21, so that the oil which flows into the mesh filter 20 is filtered, clean oil. The clean oil flows into the discharge pipe/support shaft 16 from the inlet 19 and is received by the tank (not shown) which recovers the filtered oil from the outflow ports 18, 18.

The foreign matter trapped by the through-holes 21 of the mesh filter 20 is scraped off the mesh filter by the scrapers 30, 31 due to rotation of the mesh filter. The portion of the mesh filter 20 which has been scraped by the scrapers 30, 31 is free of foreign matter and, hence, is in a reclaimed state.

The foreign matter scraped off by the scraper 31 returns to the cutting oil in separating tank 1 and grows into a comparatively heavy particulate mass which deposits on the bottom wall 2. This is then collected by the chip receptacle 4 via the discharge chute 3 by the action of the scrapers 6. Though the foreign matter scraped off the scraper 30 mixes in with the clean oil that flows through the discharge pipe/support shaft 16, the foreign matter that attaches itself to the inner side of the mesh filter 20 contains only a trace amount of solid particulate matter. When scraped off by the scraper 30, therefore, this amount of foreign matter will offer almost no difficulty even if it mixes with the clean oil.

In accordance with the mesh filter apparatus 15 having the above-described construction, the mesh filter 20 is formed into a cylindrical configuration. Therefore, assuming that the effective capture area of the filter is the same as in the prior art, the cylindrical configuration allows the space needed for installation of the filter to be reduced in comparison with the simple planar filter arrangement used conventionally. Conversely speaking, the effective capture area can be enlarged if the space available is the same. This enables the filtration capability to be improved.

In the embodiment set forth above, an example is described in which oil containing foreign matter such as cutting chips flows out from machine tools. However, the filter apparatus of the invention is not limited to this embodiment but can be widely utilized as a filter apparatus for removing solid foreign matter from any liquid.

As many apparently widely different embodiments of the present invention can be made without departing from the spirit and scope thereof, it is to be understood that the invention is not limited to the specific embodiments thereof except as defined in the appended claims.

What we claim is:

1. A filter apparatus for removing foreign matter mixed in with a liquid, comprising:
   a cylindrical filter comprising inner and outer cylindrical surfaces and a plurality of holes therethrough;
   a first scraping means having a leading edge in abutting contact with said outer cylindrical surface of said filter;
   a tank for accommodating said liquid with said foreign matter, wherein said cylindrical filter is disposed in said tank and is rotatable about its central axis by a drive mechanism, said liquid in which said foreign matter is mixed being passed through said filter from outside of said filter to inside of said filter so that said foreign matter is trapped by said plurality of holes and so that liquid inside said filter is substantially free of said foreign matter, said first scraping means for removing a majority of foreign matter from said filter to the outside of said filter;
   second scraping means for removing a remaining portion of foreign matter from said filter to the inside of said filter, said second scraping means defining a means for combining said remaining portion of foreign matter with said liquid substantially free of said foreign matter inside said cylindrical filter, said second scraping means for removing comprising a single-edged scraper having a single edge in abutting contact with said inner cylindrical surface of said filter.

2. A filter apparatus for removing foreign matter according to claim 1, wherein said single-edged scraper is in abutting contact with a lower inside portion of said cylindrical filter.

3. A filter apparatus for removing foreign matter according to claim 1, wherein said cylindrical filter comprises a punched thin flexible sheet having a smooth surface and a multiplicity of through-holes passing through said sheet, said flexible sheet being formed into a cylindrical configuration.

4. A filter apparatus for removing foreign matter according to claim 1, further comprising a discharge-pipe/support-shaft directly supported at an upper position of a side wall of said tank for rotatably supporting said cylindrical filter in said tank and for rotation by said first drive means, and having a discharge channel therein opening to the outside of said tank for discharging liquid substantially free of said foreign matter from inside said filter.

5. A filter apparatus for removing foreign matter according to claim 1, further comprising a second cylindrical filter within said tank and having inner and outer cylindrical surfaces, a plurality of holes there through, and inner and outer scraping means in abutting contact with inner and outer respective surfaces of said second cylindrical filter.

6. A filter apparatus for removing foreign matter according to claim 1, further comprising a discharge-pipe/support shaft for rotatably supporting said cylindrical filter, said discharge-pipe/support shaft having an inlet in a lower wall thereof for the passage of liquid substantially free of said foreign matter from inside said cylindrical filter to outside said tank.

7. A filter apparatus for removing foreign matter according to claim 6, wherein said single-edged scraper projects downwardly from said discharge-pipe/support shaft to abut a lower inside portion of said cylindrical filter.

8. A filter apparatus for removing foreign matter according to claim 7, wherein said single-edged scraper is connected by a bracket to said discharge-pipe/support shaft immediately adjacent said inlet in said lower wall of said discharge-pipe/support shaft.

9. A filter apparatus for removing foreign matter according to claim 8, wherein said bracket holding said single-edged scraper is connected adjacent said lower wall inlet in said discharge-pipe/support shaft on a downstream side of said inlet in relation to the direction of rotation of said cylindrical filter such that said single-edged scraper scrapes the lower inside portion of said cylindrical filter below said lower wall inlet and foreign matter removed from said lower inside portion of said cylindrical filter flows upwardly along said single-edged scraper and bracket and through said lower wall inlet in said discharge-pipe/support shaft.

10. A filter apparatus for removing foreign matter according to claim 1, further comprising a first drive means for rotating said cylindrical filter past said respective first and second scraping means.

11. A filter apparatus for removing foreign matter according to claim 10, wherein said tank for accommodating said liquid with said foreign matter comprises an inlet for said liquid from which said foreign matter is to removed, a bottom provided with a third scraping means for traveling along an inner wall of said bottom while in sliding contact therewith for removing foreign matter deposited on said bottom, and an outlet from said tank for receiving and discharging said deposited foreign matter removed by said third scraping means.

12. A filter apparatus for removing foreign matter according to claim 11, wherein said third scraping means comprises a scraper chain with a plurality of scrapers spaced at predetermined intervals therealong, said scraper chain being moved along said inner wall of said bottom of said tank past said outlet by a second drive means.

* * * * *